US012719726B2

(12) United States Patent
Nishio et al.

(10) Patent No.: US 12,719,726 B2
(45) Date of Patent: Aug. 25, 2026

(54) COMMUNICATION APPARATUS AND COMMUNICATION METHOD

(71) Applicant: Panasonic Holdings Corporation, Osaka (JP)

(72) Inventors: Akihiko Nishio, Osaka (JP); Yasuaki Yuda, Kanagawa (JP); Shotaro Maki, Kanagawa (JP); Toshiaki Sakurai, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 475 days.

(21) Appl. No.: 18/187,486

(22) Filed: Mar. 21, 2023

(65) Prior Publication Data

US 2023/0308329 A1 Sep. 28, 2023

(30) Foreign Application Priority Data

Mar. 24, 2022 (JP) ................................ 2022-049028

(51) Int. Cl.
*H04L 27/26* (2006.01)

(52) U.S. Cl.
CPC .... *H04L 27/26025* (2021.01); *H04L 27/2605* (2013.01); *H04L 27/2634* (2013.01)

(58) Field of Classification Search
CPC ........... H04L 27/26025; H04L 27/2605; H04L 27/2634; H04L 27/0008; H04L 27/2607; H04L 27/2646; H04L 27/2636
USPC ........................................ 370/310, 328, 329
See application file for complete search history.

(56) References Cited

U.S. PATENT DOCUMENTS

| | | | | |
|---|---|---|---|---|
| 2002/0068590 | A1* | 6/2002 | Suzuki | H04W 16/28 455/562.1 |
| 2007/0091988 | A1* | 4/2007 | Sadri | H04B 1/0057 375/219 |
| 2013/0177091 | A1* | 7/2013 | Lim | H04L 5/001 375/260 |
| 2019/0182812 | A1 | 6/2019 | Shimezawa et al. | |
| 2019/0182813 | A1* | 6/2019 | Yamamoto | H04L 27/2646 |
| 2022/0085936 | A1* | 3/2022 | Ly | H04L 5/0051 |
| 2022/0158731 | A1* | 5/2022 | Horikoshi | H04B 10/07951 |
| 2023/0071680 | A1* | 3/2023 | Harada | H04L 27/2602 |

FOREIGN PATENT DOCUMENTS

| | | | |
|---|---|---|---|
| JP | 2005524329 | A | 8/2005 |
| JP | 2018-074488 | A | 5/2018 |
| WO | WO 03094377 | A1 | 11/2003 |

OTHER PUBLICATIONS

3GPP, "3rd Generation Partnership Project; Technical Specification Group Radio Access Network; NR; Base Station (BS) radio transmission and reception (Release 17)," 3GPP TS 38.104 V17.4.0, Dec. 2021. (324 pages).

(Continued)

*Primary Examiner* — Obaidul Huq
(74) *Attorney, Agent, or Firm* — Seed Intellectual Property Law Group LLP

(57) ABSTRACT

A communication apparatus includes: control circuitry which, in operation, makes a setting of a radio waveform of a signal according to a radio frequency band used for transmission or reception of the signal; and communication circuitry which, in operation, transmits or receives the signal based on the setting of the radio waveform.

9 Claims, 3 Drawing Sheets

(56) References Cited

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.3.0, Sep. 2018. (92 pages).

Yamazaki et al., "Proposal for a User-Centric RAN Architecture Towards Beyond 5G," The Institute of Electronics, Information and Communication Engineers, IEICE Technical Report SAT2021-43, Oct. 2021 (7 pages).

* cited by examiner

Figure 2:
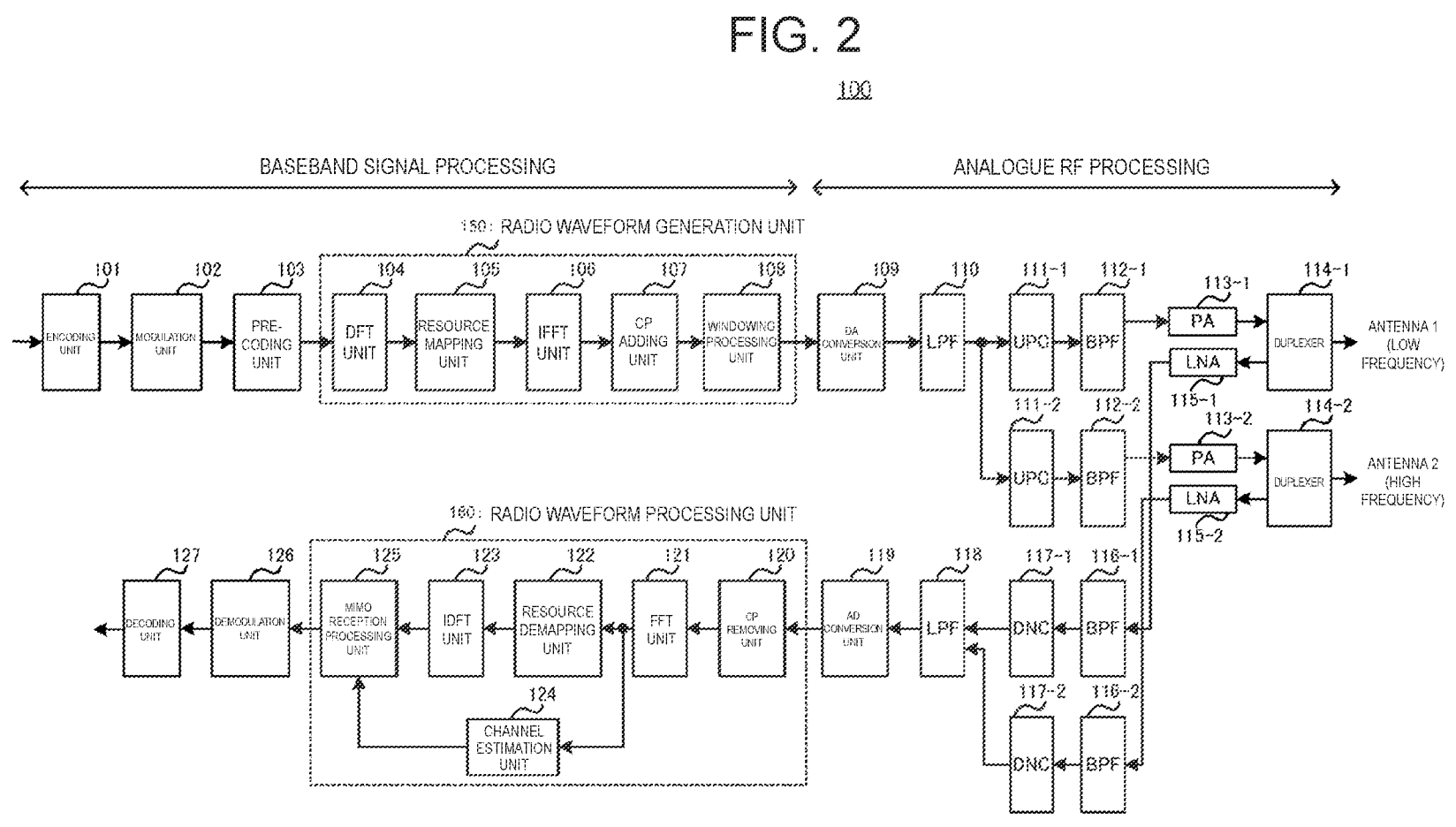

BASEBAND SIGNAL PROCESSING

ANALOGUE RF PROCESSING

150: RADIO WAVEFORM GENERATION UNIT

101 ENCODING UNIT

102 MODULATION UNIT

103 PRE-CODING UNIT

104 DFT UNIT

105 RESOURCE MAPPING UNIT

106 IFFT UNIT

107 CP ADDING UNIT

108 WINDOWING PROCESSING UNIT

109 D/A CONVERSION UNIT

110 LPF 111-1 UPC 111-2 UPC 112-1 BPF 112-2 BPF 113-1 PA 113-2 PA 114-1 DUPLEXER 114-2 DUPLEXER

ANTENNA 1 (LOW FREQUENCY)

ANTENNA 2 (HIGH FREQUENCY)

115-1 LNA 115-2 LNA 116-1 BPF 116-2 BPF 117-1 DNC 117-2 DNC

118 LPF

119 A/D CONVERSION UNIT

160: RADIO WAVEFORM PROCESSING UNIT

120 CP REMOVING UNIT

121 FFT UNIT

122 RESOURCE DEMAPPING UNIT

123 IDFT UNIT

124 CHANNEL ESTIMATION UNIT

125 MIMO RECEPTION PROCESSING UNIT

126 DEMODULATION UNIT

127 DECODING UNIT

FIG. 3

| | DFT | IFFT | CP ADDING | WINDOWING |
|---|---|---|---|---|
| OPERATION EXAMPLE 1 | × | ○ | ○ | ○ |
| OPERATION EXAMPLE 2 | ○ | ○ | ○ | ○ |
| OPERATION EXAMPLE 3 | ○ | ○ | × | × |
| OPERATION EXAMPLE 4 | × | × | × | × |

COMMUNICATION APPARATUS AND COMMUNICATION METHOD

BACKGROUND

1. Technical Field

The present disclosure relates to a communication apparatus and a communication method.

2. Description of the Related Art

In cellular wireless communication including 5G new radio access technology (NR), communication using a baseband radio waveform is performed.

SUMMARY

However, there is room for study on a method of appropriately setting the radio waveform.

A non-limiting exemplary embodiment of the present disclosure contributes to providing a communication apparatus and a communication method capable of appropriately setting a radio waveform.

A communication apparatus according to an exemplary embodiment of the present disclosure includes: control circuitry which, in operation, makes a setting of a radio waveform of a signal according to a radio frequency band used for transmission or reception of the signal; and communication circuitry which, in operation, transmits or receives the signal based on the setting of the radio waveform.

It should be noted that general or specific embodiments may be implemented as a system, a method, an integrated circuit, a computer program, a storage medium, or any selective combination thereof.

According to an exemplary embodiment of the present disclosure, a radio waveform can be appropriately set.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a block diagram illustrating a configuration example of the communication apparatus; and FIG. 3 is a diagram illustrating operation examples of radio waveform generation.

DETAILED DESCRIPTIONS

Figure 1:
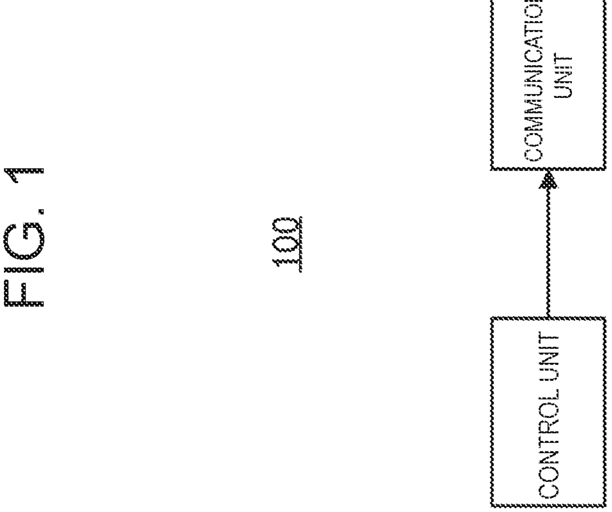
FIG. 1 is a block diagram illustrating a configuration example of a part of a communication apparatus.

Hereinafter, exemplary embodiments of the present disclosure will be described in detail with reference to the drawings.

In cellular wireless communication such as 5G NR, for example, communication using a baseband radio waveform (waveform, also referred to as a signal waveform) defined in a system regardless of a radio frequency band (for example, also referred to as a carrier frequency or a frequency band.) is performed.

For example, in long term evolution (LTE), orthogonal frequency division multiplexing (hereinafter, referred to as "CP-OFDM") to which a cyclic prefix (CP) is added is used for a downlink radio waveform, and DFT-S-OFDM (hereinafter referred to as "CP-DFT-S-OFDM") to which a CP is added is used for an uplink radio waveform. Furthermore, for example, in the 5G NR, CP-OFDM is used for a downlink radio waveform, and CP-OFDM or CP-DFT-S-OFDM is used for an uplink radio waveform (See, e.g., 3GPP TS 38.300, V15.3.0 "NR; NR and NG-RAN Overall Description; Stage 2 (Release 15)", 2018-09).

Note that OFDM is an abbreviation for orthogonal frequency division multiplexing, and DFT-S-OFDM is an abbreviation for discrete Fourier transform—spread-OFDM. Furthermore, DFT-S-OFDM may also be referred to as single carrier—frequency division multiple access (SC-FDMA).

In a 6G system (sixth generation mobile communication system), utilization of radio waves in a terahertz band of 100 GHz or more (alternatively, a sub-terahertz band) has been studied. For example, a system using a terahertz wave for communication in the vicinity of a terminal has been proposed in Kosuke Yamazaki, Takeo Ohseki, Yoshiaki Amano, Takahide Murakami, Hiroyuki Shinbo, Yoji Kishi, "PROPOSAL FOR A USER-CENTRIC RAN ARCHITECTURE TOWARDS BEYOND 5G", IEICE Technical Report, vol. 121, no. 189, SAT2021-43, pp. 4-10, October 2021.

In the 6G system, for example, since an existing frequency band is also used in addition to the terahertz band, radio waves in various radio frequency bands from a frequency band of 1 GHz or less (sub-gigahertz band) to the terahertz band (for example, 300 GHz band) can be used. When communication using the same radio waveform is performed on these various radio frequency bands, various limitations may occur.

For example, in multi-carrier transmission such as OFDM, an error rate characteristic under a frequency-selective fading environment is good, and realization of high-speed transmission by multiple-input multiple output (MIMO) transmission can be expected. On the other hand, in OFDM, since a peak to average power ratio (PAPR) of a signal is high and a large backoff is taken with respect to a power amplifier input, for example, transmission with sufficiently low power with respect to the maximum output of the power amplifier is required. For example, the higher the radio frequency band, the larger the propagation attenuation, and it is difficult to realize high output by a low-cost power amplifier. Therefore, when OFDM is used as the radio waveform, transmittable power is limited, and a coverage area is likely to decrease.

Furthermore, in single-carrier transmission such as DFT-S-OFDM, the PAPR is low, it is not necessary to take a large backoff with respect to the power amplifier input, and transmission with high power according to the maximum output of the power amplifier is possible, so that a wide coverage area can be realized. On the other hand, in the single-carrier transmission, the error rate characteristic in the frequency-selective fading environment tends to deteriorate, and the throughput tends to be limited.

In a non-limiting exemplary embodiment of the present disclosure, for example, a method of appropriately setting (or generating) a signal of a radio waveform to be used in each of various radio frequency bands will be described. For example, a communication apparatus (for example, at least one of a base station and a terminal) may set a radio waveform according to a radio frequency band used for communication and generate a baseband signal of the set radio waveform.

[Overview of Communication System]

A communication system according to an exemplary embodiment of the present disclosure includes at least one communication apparatus 100. Communication apparatus 100 may be, for example, a base station (for example, also referred to as a gNB) or a terminal (for example, user equipment (UE)).

For example, communication apparatus 100 may perform at least one of transmission and reception on signals of a plurality of radio frequency bands.

FIG. 1 is a block diagram illustrating a configuration example of a part of communication apparatus 100. In communication apparatus 100 illustrated in FIG. 1, a control unit (for example, corresponding to control circuitry) sets a radio waveform of a signal according to a radio frequency band used for transmission or reception of the signal. A communication unit (for example, communication circuitry) transmits or receives the signal on the basis of the setting of the radio waveform.

[Configuration Example of Communication Apparatus]

FIG. 2 is a block diagram illustrating an example of a configuration of communication apparatus 100 according to the present exemplary embodiment.

At least one of encoding unit 101 to windowing processing unit 108 and CP removing unit 120 to decoding unit 127 illustrated in FIG. 2 may be included in, for example, the control unit illustrated in FIG. 1. Furthermore, at least one of DA conversion unit 109 to AD conversion unit 119 illustrated in FIG. 2 may be included in, for example, the communication unit illustrated in FIG. 1.

<Transmission Processing>

In FIG. 2, processing of encoding unit 101, modulation unit 102, precoding unit 103, DFT unit 104, resource mapping unit 105, inverse fast Fourier transform (IFFT) unit 106, CP adding unit 107, and windowing processing unit 108 may be referred to as "baseband signal processing". Furthermore, in FIG. 2, processing of DA conversion unit 109, low pass filter (LPF) 110, up-converter (UPC) 111, band pass filter (BPF) 112, power amplifier (PA) 113, and duplexer 114 may be referred to as "analogue radio frequency (RF) processing".

Furthermore, in FIG. 2, DFT unit 104, resource mapping unit 105, IFFT unit 106, CP adding unit 107, and windowing processing unit 108 may be included in "radio waveform generation unit 150" that generates a radio waveform. The processing of each configuration unit included in radio waveform generation unit 150 may be omitted, for example, according to an instruction of a control unit (not illustrated). For example, communication apparatus 100 (for example, the control unit) may determine whether or not to perform processing of each configuration unit included in radio waveform generation unit 150 according to a radio frequency band (for example, a terahertz band and a millimeter wave band) used for signal transmission (an example will be described later).

Furthermore, in FIG. 2, each of UPC 111, BPF 112, PA 113, and duplexer 114 may be individually provided for a radio frequency band used for transmission. In the example illustrated in FIG. 2, UPC 111-1, BPF 112-1, PA 113-1, and duplexer 114-1 may be provided for a low frequency band (for example, the millimeter wave band), and UPC 111-2, BPF 112-2, PA 113-2, and duplexer 114-2 may be provided for high frequency band (for example, the terahertz band).

Furthermore, in a case where MIMO transmission using a plurality of antennas is performed in each radio frequency band, the processing after precoding unit 103 illustrated in FIG. 2 may be performed for each antenna system.

In FIG. 2, encoding unit 101 performs error correction coding on a signal by using coding methods such as turbo coding, low density parity check (LDPC) coding, and polar coding.

For example, modulation unit 102 maps encoded bit string to an IQ constellation such as quadrature phase shift keying (QPSK) and 16-quadrature amplitude modulation (16QAM) to generate modulation symbols.

For example, precoding unit 103 performs precoding processing (for example, weighting processing on the modulation symbols) for MIMO transmission on the modulation symbols input from modulation unit 102. Note that, in a case where communication apparatus 100 does not perform MIMO transmission, precoding unit 103 does not need to perform processing.

For example, DFT unit 104 performs DFT processing (also referred to as DFT spreading or DFT precoding) on a signal input from precoding unit 103.

Resource mapping unit 105 maps the signal after the DFT processing to a frequency resource (for example, a subcarrier or a resource block (RB)) used for transmission.

IFFT unit 106 performs, for example, IFFT processing on the signal mapped to the frequency resource.

CP adding unit 107 adds a CP by, for example, copying a sample of a part (for example, a rear part of an OFDM symbol) of the signal after the IFFT to a head.

Windowing processing unit 108 performs windowing processing on the signal to which the CP is added (for example, OFDM symbols). The windowing processing is, for example, processing for reducing out-of-band radiation power due to discontinuity between the OFDM symbols. For the windowing processing, for example, a window function of a root raised cosine waveform may be used. Furthermore, windowing processing unit 108 may perform, for example, weighted overlap and add (WOLA) processing of causing the adjacent OFDM symbols to overlap with each other.

DA conversion unit 109 performs digital-analogue conversion on a signal (radio waveform) input from radio waveform generation unit 150 (for example, windowing processing unit 108).

LPF 110 performs, for example, LPF processing of passing a desired low frequency component of the signal input from DA conversion unit 109.

For example, UPC 111 up-converts a frequency of the signal input from LPF 110 to a transmission frequency. Note that UPC 111 may use, for example, a plurality of stages of the up-converters.

For example, BPF 112 performs filter processing of passing a desired band component on the signal input from UPC 111.

For example, PA 113 amplifies the signal input from BPF 112 to desired transmission power.

Duplexer 114 switches between transmission and reception. The transmission and the reception may be switched at a switching timing between uplink and downlink of a time division duplex (TDD) frame, for example.

<Reception Processing>

In FIG. 2, processing of duplexer 114, low noise amplifier (LNA) 115, BPF 116, down-converter (DNC) 117, LPF 118, and AD conversion unit 119 may be referred to as "analogue RF processing". Furthermore, in FIG. 2, processing of CP removing unit 120, fast Fourier transform (FFT) unit 121, resource demapping unit 122, inverse discrete Fourier transform (IDFT) unit 123, channel estimation unit 124, MIMO reception processing unit 125, demodulation unit 126, and decoding unit 127 may be referred to as "baseband signal processing".

Furthermore, in FIG. 2, CP removing unit 120, FFT unit 121, resource demapping unit 122, IDFT unit 123, channel estimation unit 124, and MIMO reception processing unit 125 may be included in "radio waveform processing unit 160" that performs processing related to a radio waveform. The processing of each configuration unit included in radio waveform processing unit 160 may be omitted, for example, according to an instruction of a control unit (not illustrated). For example, communication apparatus 100 (for example, the control unit) may determine whether or not to perform processing of each configuration unit included in radio waveform processing unit 160 according to a radio frequency band (for example, the terahertz band and the millimeter wave band) used for signal reception (an example will be described later).

Furthermore, in FIG. 2, each of duplexer 114, LNA 115, BPF 116, and DNC 117 may be individually provided for a radio frequency band used for reception. In the example illustrated in FIG. 2, duplexer 114-1, LNA 115-1, BPF 116-1, and DNC 117-1 may be provided for the low frequency band (for example, the millimeter wave band), and duplexer 114-2, LNA 115-2, BPF 116-2, and DNC 117-2 may be provided for the high frequency band (for example, the terahertz band).

In FIG. 2, a reception signal output from duplexer 114 is input to LNA 115.

LNA 115 amplifies the reception signal input from duplexer 114.

BPF 116 performs filter processing of passing a desired band component on the signal input from LNA 115.

DNC 117 down-converts a frequency of the signal input from BPF 116.

LPF 118 performs LPF processing of passing a desired low frequency component of the signal input from DNC 117.

AD conversion unit 119 performs analogue-digital conversion on the signal input from LPF 118.

CP removing unit 120 removes the CP added to the signal input from AD conversion unit 119.

FFT unit 121 performs FFT processing (for example, conversion from a time component to a frequency component) on the signal input from CP removing unit 120.

Using the signal input from FFT unit 121, resource demapping unit 122 extracts a signal of a frequency resource (for example, a subcarrier or resource block) to which data is allocated.

IDFT unit 123 performs IDFT processing on the signal input from resource demapping unit 122.

Channel estimation unit 124 estimates a channel (propagation path) fluctuation by using, for example, a reference signal (for example, reference signal (RS)) included in the signal after the FFT.

MIMO reception processing unit 125 performs MIMO reception processing including channel equalization on the signal input from IDFT unit 123 on the basis of a channel estimation result input from channel estimation unit 124, for example, and detects each multiplexed stream signal. Note that, in a case where the MIMO transmission is not performed, the MIMO reception processing unit may perform the channel equalization and may not detect a stream signal.

Demodulation unit 126 converts a modulation symbol modulated by a modulation method such as QPSK or 16QAM into a bit string.

Decoding unit 127 performs decoding processing of a bit string encoded by an encoding method such as an LDPC code.

[Operation Example of Communication Apparatus]

Next, an operation example of communication apparatus 100 will be described.

As an example, an operation example of radio waveform generation unit 150 of communication apparatus 100 will be described.

The presence or absence of an operation of each processing unit (for example, DFT unit 104, IFFT unit 106, CP adding unit 107, and windowing processing unit 108) of radio waveform generation unit 150 may be set according to a radio frequency band used for transmission. For example, the operation of each processing unit of radio waveform generation unit 150 may be different according to a radio frequency band used for transmission. Therefore, for example, the radio waveform generated by radio waveform generation unit 150 may be different according to the radio frequency band used for transmission.

Hereinafter, as an example, a case where a terahertz wave (for example, an example of a high frequency band) and a millimeter wave (for example, an example of a low frequency band) are used as a radio frequency band used for transmission by communication apparatus 100 will be described.

For example, in a case where the terahertz wave is used, radio waveform generation unit 150 may not perform the IFFT processing on a transmission signal as the setting of the radio waveform, and in a case where the millimeter wave is used, the radio waveform generation unit may perform the IFFT processing on the transmission signal as the setting of the radio waveform. As a result, in a case where the terahertz wave is used, transmission using no subcarrier is performed, and in a case where the millimeter wave is used, transmission using a subcarrier is performed. Therefore, in the case of using the terahertz wave, the PAPR can be reduced as compared with the case of using the millimeter wave.

Furthermore, for example, in a case where the terahertz wave is used, radio waveform generation unit 150 may perform the DFT processing on the transmission signal as the setting of the radio waveform, and in a case where the millimeter wave is used, the radio waveform generation unit may not perform the DFT processing on the transmission signal as the setting of the radio waveform. As a result, multi-carrier transmission is performed in a case where the terahertz wave is used, and single-carrier transmission is performed in a case where the millimeter wave is used. Therefore, in the case of using the millimeter wave, PAPR can be reduced as compared with the case of using the terahertz wave.

Furthermore, for example, radio waveform generation unit 150 may not add the CP to the transmission signal as the setting of the radio waveform in a case where the terahertz wave is used, and may add the CP to the transmission signal as the setting of the radio waveform in a case where the millimeter wave is used. As a result, in the case of using the millimeter wave, resistance to a delayed wave (multipath) is improved by the CP adding as compared with the case of using the terahertz wave.

Furthermore, for example, in a case where the terahertz wave is used, radio waveform generation unit 150 may not perform the windowing processing on the transmission signal as the setting of the radio waveform, and in a case where the millimeter wave is used, the radio waveform generation unit may perform the windowing processing as the setting of the radio waveform. As a result, in the case of using the millimeter wave, out-of-band radiation power is reduced as compared with the case of using the terahertz wave (Alternatively, radiation to a narrower band is performed.).

FIG. 3 illustrates an example (operation examples 1 to 4) of the presence or absence of the operation of each processing unit (for example, DFT unit 104, IFFT unit 106, CP adding unit 107, and windowing processing unit 108) of radio waveform generation unit 150.

In FIG. 3, "○" indicates that the corresponding processing unit performs the operation, and "x" indicates that the corresponding processing unit does not perform the operation.

Operation Example 1

In operation example 1, for example, the DFT processing is not performed, and the IFFT processing, the CP adding, and the Windowing processing are performed.

In operation example 1, the DFT processing is not performed, and the IFFT processing is performed, so that a data signal mapped to a resource (for example, a subcarrier) in a frequency domain is converted into a time domain signal and transmitted. Therefore, in operation example 1, communication apparatus 100 transmits the transmission signal as an OFDM signal (for example, a multi-carrier signal).

Furthermore, in operation example 1, the CP adding improves the resistance to the delayed wave (multipath), and the windowing processing reduces the out-of-band radiation power.

Note that, in operation example 1, since multi-carrier transmission is used, PAPR is higher than that in single-carrier transmission, and a transmission output is likely to be limited. Therefore, operation example 1 is preferably applied to, for example, a case where propagation attenuation is smaller, a case where delay dispersion is larger, or a case where available frequency bands may be more limited. Therefore, operation example 1 may be applied to a case where the radio frequency is low, for example.

Operation Example 2

In operation example 2, all of the DFT processing, the IFFT processing, the CP adding, and the Windowing processing are performed.

In operation example 2, by performing the DFT processing before the IFFT processing, a frequency component of the data signal mapped to each subcarrier is converted into a time domain signal again. Therefore, in operation example 2, the communication apparatus 100 transmits the transmission signal as a single-carrier signal.

Furthermore, in operation example 2, the CP adding improves the resistance to the delayed wave (multipath), and the windowing processing reduces the out-of-band radiation power (Alternatively, radiation to a narrower band is performed.).

Operation example 2 is preferably applied to, for example, a case where the delay dispersion is larger or a case where available frequency bands may be more limited.

Furthermore, since operation example 2 is single-carrier transmission, PAPR can be suppressed as compared with multi-carrier transmission, operation example 2 may be applied to a case where the radio frequency is higher as compared with operation example 1.

Operation Example 3

In operation example 3, the DFT processing and the IFFT processing are performed, and the CP adding and the Windowing processing are not performed.

In operation example 3, single-carrier transmission is performed similarly to operation example 2. Furthermore, in operation example 3, since the CP adding and the Windowing processing are not performed, the resistance to the delayed wave (multipath) is low, and the out-of-band radiation power tends to increase (Alternatively, radiation to a wider band is likely to occur.). Therefore, operation example 3 is preferably applied to a case where the delay dispersion is smaller or a case where an available frequency band is wider.

Therefore, operation example 3 may be applied to a case where the radio frequency is higher as compared with operation example 1 and operation example 2.

Operation Example 4

In operation example 4, none of the DFT processing, the IFFT processing, the CP adding, and the Windowing processing is performed.

Therefore, in operation example 4, communication apparatus 100 transmits the data signal as it is as a signal sequence in the time domain. Therefore, in operation example 4, the transmission signal is a single-carrier signal on which the CP adding and the windowing processing are not performed.

Furthermore, in operation example 4, similarly to operation example 3, the resistance to the delayed wave (multipath) is low, and the out-of-band radiation power tends to increase (Alternatively, radiation to a wider band is likely to occur.). Therefore, operation example 4 is preferably applied to a case where the delay dispersion is smaller or a case where an available frequency band is wider. Therefore, operation example 4 may be applied to a case where the radio frequency is higher as compared with operation example 1 and operation example 2.

Furthermore, in operation example 4, because the DFT processing and the IFFT processing are not performed, for example, the transmission is not performed using the subcarrier, the PAPR can be reduced as compared with operation example 3. Therefore, operation example 4 may be applied to a case where the radio frequency is higher than that in operation example 3, for example.

Furthermore, in operation example 4, since the DFT processing and the IFFT processing are not performed, power consumption can be reduced. For example, as a signal bandwidth is wider, the power consumption of the DFT processing and the IFFT processing tends to be higher. Therefore, operation example 4 may be applied to a case where the radio frequency at which a wider bandwidth can be used is higher than that in operation examples 1 to 3.

Operation examples 1 to 4 have been described above.

As an example, radio waveform generation unit 150 may generate a radio waveform by the processing of operation example 1 in a case of using a radio frequency band of a millimeter wave (for example, 24 GHz to 72 GHz), and may generate a radio waveform by any processing of operation examples 2 to 4 in a case of using a radio frequency band of a terahertz wave (for example, 100 GHz or more).

Alternatively, for example, in a case where a radio frequency band of a millimeter wave is used, radio waveform generation unit 150 may generate a radio waveform by the processing of operation example 1 or operation example 2, and in a case where a radio frequency band of a terahertz wave is used, the radio waveform generation unit may generate a radio waveform by the processing of operation example 3 or operation example 4.

Alternatively, for example, radio waveform generation unit 150 may generate a radio waveform by the processing of operation example 1 in the case of using a radio frequency of a sub 6 GHz band (for example, 100 MHz to 6 GHz), generate a radio waveform by the processing of operation example 2 in the case of using a radio frequency band of a millimeter wave, and generate a radio waveform by the processing of operation example 3 or operation example 4 in the case of using a radio frequency band of a terahertz wave.

Note that association between a radio frequency band used for transmission and a radio waveform (for example, a radio waveform generated by any of operation examples 1 to 4 illustrated in FIG. 3) used in the radio frequency band is not limited to the above-described example, and other association may be used.

For example, radio waveform generation unit 150 may generate the radio waveform according to a higher-numbered operation example in the operation examples 1 to 4 illustrated in FIG. 3 as the radio frequency used for transmission is higher.

As described above, in the present exemplary embodiment, communication apparatus 100 sets the radio waveform of the transmission signal according to the frequency band (for example, the carrier frequency) used for transmission. As a result, communication apparatus 100 can transmit a data signal using a radio waveform suitable for a radio frequency band to be used for transmission, so that throughput and coverage performance can be improved.

Furthermore, for example, as illustrated in FIG. 3, communication apparatus 100 switches the presence or absence of processing (on or off) in each processing unit of radio waveform generation unit 150 according to a radio frequency band (alternatively, the generated radio waveform) used for transmission. Therefore, in communication apparatus 100, a processing unit (for example, radio waveform generation unit 150) for generating a radio waveform is shared by a plurality of different radio frequency bands. Therefore, according to the present exemplary embodiment, for example, communication apparatus 100 does not need to include an individual processing unit in a radio frequency band, and the configuration can be simplified. Furthermore, communication apparatus 100 can generate a radio waveform suitable for a radio frequency band to be used by simple processing by switching the presence or absence of processing according to the radio frequency band.

The exemplary embodiment of the present disclosure has been described above.

Modification Example 1

In modification example 1, a radio waveform (for example, an operation of radio waveform generation unit 150) may be set on the basis of a propagation environment of communication (communication in a used radio frequency band) in communication apparatus 100.

For example, as a propagation environment assumed in a communication system, in a line of sight environment (LOS), propagation attenuation tends to be small, and a delay amount of a delay wave (multipath) tends to be small and the number of delay waves tends to be small.

On the other hand, as a propagation environment assumed in a communication system, in a non line of sight (NLOS) environment, communication is performed by a diffracted wave or a reflected wave, and therefore propagation attenuation tends to be large, and a delay amount of a delayed wave tends to be large and the number of delay waves tends to be large.

For this reason, for example, communication apparatus 100 may generate the radio waveform according to operation example 1 in which the multi-carrier (OFDM) transmission is performed in the line of sight environment, and may generate the radio waveform according to any one of operation examples 2 to 4 in which the single-carrier transmission is performed in the non line of sight environment.

Alternatively, for example, communication apparatus 100 may apply the above-described operation example (for example, an operation example having a higher number in FIG. 3) in a case where the radio frequency is high in the line of sight environment, and may apply the above-described operation example (for example, an operation example with a lower number in FIG. 3) in a case where the radio frequency is low in the non line of sight environment.

In other words, communication apparatus 100 may perform an operation similar to the case of using the terahertz wave described above in the line of sight environment, and may perform an operation similar to the case of using the millimeter wave described above in the non line of sight environment.

Modification Example 2

In modification example 2, an operation of the radio waveform (for example, radio waveform generation unit 150) may be set on the basis of antenna directivity used in the radio frequency band used by communication apparatus 100.

For example, the stronger the antenna directivity (for example, the thinner the generated beam), the greater the transmission power (radiation power from the antenna) that communication apparatus 100 can transmit. Furthermore, for example, as the antenna directivity is stronger, a delay amount of the delayed wave tends to be smaller and the number of delayed waves tends to be smaller.

Therefore, for example, communication apparatus 100 may generate a radio waveform by operation example 1 which is multi-carrier (OFDM) transmission in a case where the antenna directivity is strong (alternatively, in a case where a strong directional antenna is used), and may generate a radio waveform by any of operation examples 2 to 4 which are single-carrier transmission in a case where the antenna directivity is weak (alternatively, in a case where a weak directional antenna is used).

Alternatively, for example, in a case where the antenna directivity is strong, communication apparatus 100 may apply the above-described operation example (for example, an operation example having a higher number in FIG. 3) in a case where the radio frequency is high, and in a case where the antenna directivity is weak, the communication apparatus may apply the above-described operation example (for example, an operation example with a lower number in FIG. 3) in a case where the radio frequency is low.

In other words, in a case where the antenna directivity is strong, communication apparatus 100 may perform an operation similar to that in a case where the above-described terahertz wave is used, and in a case where the antenna directivity is weak, the communication apparatus may perform an operation similar to that in a case where the above-described millimeter wave is used.

Note that the antenna directivity may be expressed as an antenna gain. For example, communication apparatus 100 may determine that the antenna directivity is strong when the antenna gain is greater than or equal to a threshold value, and may determine that the antenna directivity is weak when the antenna gain is less than the threshold value. For example, communication apparatus 100 may set an operation of generating a radio waveform according to the antenna gain.

Modification Example 3

In modification example 3, a radio waveform (for example, an operation of radio waveform generation unit 150) may be set on the basis of a subcarrier spacing (SCS) used in a radio frequency band used by communication apparatus 100.

For example, the narrower the subcarrier spacing, the longer the OFDM symbol length, and the longer CP can be used. On the other hand, the wider the subcarrier spacing, the shorter the OFDM symbol length, which tends to make it difficult to use a long CP.

Therefore, for example, in a case where the subcarrier spacing is narrow (for example, when the subcarrier spacing is less than a threshold value), communication apparatus 100 may generate a radio waveform by operation example 1 or operation example 2 in which the CP is added, and in a case where the subcarrier spacing is wide (for example, when the subcarrier spacing is greater than or equal to the threshold value), the communication apparatus may generate a radio waveform by operation example 3 or operation example 4 in which the CP is not added.

For example, in a case where the subcarrier spacing is wide, communication apparatus 100 may perform an operation similar to that in a case where the above-described terahertz wave is used, and in a case where the subcarrier spacing is narrow, the communication apparatus may perform an operation similar to that in a case where the above-described millimeter wave is used.

Alternatively, for example, in a case where the subcarrier spacing is wide, communication apparatus 100 may generate a radio waveform by an operation of not performing the CP adding (for example, processing in which the DFT processing and the CP adding are not performed and the IFFT processing and the windowing processing are performed) as a modification of operation example 1.

Modification Example 4

In modification example 4, a radio waveform (for example, an operation of radio waveform generation unit 150) may be set based on a CP length used in a radio frequency band used by communication apparatus 100.

For example, a propagation environment with a larger delay amount of a delayed wave (multipath) is more likely to use a longer CP length, and a propagation environment with a smaller delay amount is more likely to use a shorter CP length.

Therefore, for example, for the same reason as in modification example 1, communication apparatus 100 may generate a radio waveform according to operation example 1 of multi-carrier (OFDM) transmission in a case where the CP length is long (for example, in a case where the CP length is greater than or equal to a threshold value), and generate a radio waveform according to any of operation examples 2 to 4 of single-carrier transmission in a case where the CP length is short (for example, in a case where the CP length is less than the threshold value).

For example, in a case where the CP length is short, communication apparatus 100 may perform an operation similar to that in a case where the above-described terahertz wave is used, and in a case where the CP length is long, the communication apparatus may perform an operation similar to that in a case where the above-described millimeter wave is used.

Modification examples 1 to 4 have been described above.

Note that at least two of the above-described exemplary embodiment and modification examples 1 to 4 may be combined. For example, the radio waveform applied in each frequency band may be set (or switched or changed) according to a predetermined condition such as a propagation environment or setting (for example, an antenna gain, a subcarrier spacing, or a CP length) of communication apparatus 100.

For example, the radio waveform may be determined according to a combination of the radio frequency band to be used described in the first exemplary embodiment and the propagation environment described in modification example 1. For example, communication apparatus 100 may generate different radio waveforms in the line of sight environment and the non line of sight environment in the case of using the millimeter wave, and in the line of sight environment and the non line of sight environment in the case of using the terahertz wave.

Furthermore, in FIG. 3, operation example 1 may be referred to as "OFDM (or CP OFDM)", operation example 2 and operation example 3 may be referred to as "DFT-S-OFDM" or "SC-FDMA", and operation example 4 may be referred to as "Single Carrier (SC)". Furthermore, operation example 2 may be referred to as "CP DFT-S-OFDM" or "CP SC-FDMA", and operation example 3 may be referred to as "CP-less DFT-S-OFDM" or "CP-less SC-FDMA".

Furthermore, the millimeter wave band may be read as a frequency of "frequency range 2 (FR2)". The sub 6 GHz band may be read as a frequency of "frequency range 1 (FR1)".

The radio frequency may also be referred to as a carrier frequency.

Furthermore, the number of frequency bands used by communication apparatus 100 is not limited to 2 or 3, and may be 4 or more frequency bands. For example, radio waveform generation unit 150 may individually set the radio waveform to be generated in each of the four or more frequency bands to the frequency band. The frequency band may be, for example, an operating band (n1, n2, or the like) described in 3GPP TS38.104 V17.4.0.

Furthermore, in the above exemplary embodiment, the operation on a transmission side of communication apparatus 100 has been described. However, communication apparatus 100 may also perform radio waveform processing on a reception side (for example, radio waveform processing unit 160) according to a radio frequency band used for reception. For example, communication apparatus 100 may determine (or assume) a radio waveform to be applied to a signal according to a radio frequency band used for a received signal. For example, in the case of operation example 1 illustrated in FIG. 3, radio waveform processing unit 160 may perform the CP removing and the FFT processing and may not perform the IDFT processing. Furthermore, for example, in the case of operation example 2 illustrated in FIG. 3, radio waveform processing unit 160 may perform the CP removing, the FFT processing, and the IDFT processing. Furthermore, for example, in the case of operation example 3 illustrated in FIG. 3, radio waveform processing unit 160 may perform the FFT processing and the IDFT processing without performing the CP removing. Furthermore, for example, in the case of operation example 4 illustrated in FIG. 3, radio waveform processing unit 160 does not need to perform the CP removing, the FFT processing, and the IDFT processing.

Furthermore, in communication apparatus 100, the frequency bands used for transmission and reception or the number of frequency bands may be different.

In addition, the operation examples illustrated in FIG. 3 is an example, and the operation of radio waveform generation unit 150 is not limited to the operation illustrated in FIG. 3. For example, radio waveform generation unit 150 may perform the IFFT processing and the CP adding without performing the DFT processing and the windowing processing. Alternatively, for example, the radio waveform generation unit 150 may perform the IFFT processing without performing the DFT processing, the CP adding, and the windowing processing.

Furthermore, filtering processing may be performed instead of the windowing processing, or another waveform shaping processing for limiting the frequency band may be performed.

Furthermore, in the above-described exemplary embodiment, the terahertz wave and the millimeter wave have been described as examples of the radio frequency band, but the present disclosure is not limited thereto, and the frequency band used for transmission or reception in communication apparatus 100 may be another frequency band or a combination of other frequency bands.

Furthermore, the configuration (for example, encoding unit 101, modulation unit 102, precoding unit 103, DFT unit 104, resource mapping unit 105, IFFT unit 106, CP adding unit 107 and windowing processing unit 108, and CP removing unit 120, FFT unit 121, resource demapping unit 122, IDFT unit 123, channel estimation unit 124, MIMO reception processing unit 125, demodulation unit 126 and decoding unit 127) for performing the baseband processing illustrated in FIG. 2 is an example, and the present disclosure is not limited thereto. For example, a part of the configuration for performing the baseband processing illustrated in FIG. 2 may not be included, and other configuration units may be included.

Furthermore, in communication apparatus 100, the setting (alternatively, whether or not the setting is performed) of the radio waveform to be used in each frequency band may be explicitly or implicitly notified (or set) to communication apparatus 100 from another device, may be set in communication apparatus 100 in advance, or may be defined in advance in the standard.

The base station may be referred to as a gNodeB or a gNB. Furthermore, the terminal may be referred to as UE.

Furthermore, in the above exemplary embodiment, the notation "unit" used for each component may be replaced with another notation such as "circuit (circuitry)", "device", or "module".

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks.

The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus. The communication apparatus may include a radio transceiver (transceiver) and a processing or control circuit. The radio transceiver may include a receiver and a transmitter, or include receiving and transmitting functions. The radio transceiver (the transmission unit and the reception unit) may include a radio frequency (RF) module and one or more antennas. The RF module may include an amplifier, and an RF modulator and demodulator, or the like.

Some non-limiting examples of such communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an exemplary embodiment of the present disclosure includes: control circuitry which, in operation, makes a setting of a radio waveform of a signal according to a radio frequency band used for transmission or reception of the signal; and communication circuitry which, in operation, transmits or receives the signal based on the setting of the radio waveform.

In an exemplary embodiment of the present disclosure, the control circuitry performs discrete Fourier transform (DFT) on the signal as the setting of the radio waveform when a first radio frequency band is used, and does not perform the DFT on the signal as the setting of the radio waveform when a second radio frequency band lower than the first radio frequency band is used.

In an exemplary embodiment of the present disclosure, the control circuitry does not add a cyclic prefix (CP) to the signal as the setting of the radio waveform when a first radio frequency band is used, and adds the CP to the signal as the setting of the radio waveform when a second radio frequency band lower than the first radio frequency band is used.

In an exemplary embodiment of the present disclosure, the control circuitry does not perform windowing on the signal as the setting of the radio waveform when a first radio frequency band is used, and performs the windowing as the setting of the radio waveform when a second radio frequency band lower than the first radio frequency band is used.

In an exemplary embodiment of the present disclosure, the control circuitry does not perform inverse fast Fourier transform (IFFT) on the signal as the setting of the radio waveform when a first radio frequency band is used, and performs the IFFT on the signal as the setting of the radio waveform when a second radio frequency band lower than the first radio frequency band is used.

In an exemplary embodiment of the present disclosure, the control circuitry makes the setting of the radio waveform based on a propagation environment of communication in the radio frequency band.

In an exemplary embodiment of the present disclosure, the control circuitry makes the setting of the radio waveform based on antenna directivity used in the radio frequency band.

In an exemplary embodiment of the present disclosure, the control circuitry makes the setting of the radio waveform based on a subcarrier spacing used in the radio frequency band.

In an exemplary embodiment of the present disclosure, the control circuitry makes the setting of the radio waveform based on a cyclic prefix (CP) length used in the radio frequency band.

A communication method according to an exemplary embodiment of the present disclosure, which is performed by a communication apparatus, includes: making a setting of a radio waveform of a signal according to a radio frequency band used for transmission or reception of the signal; and transmitting or receiving the signal based on the setting of the radio waveform.

An aspect of the present disclosure is useful for a wireless communication system.

What is claimed is:

1. A communication apparatus comprising:

control circuitry which, in operation, makes a setting of a radio waveform of a signal according to a radio frequency band used for transmission of the signal; and communication circuitry which, in operation, transmits the signal based on the setting of the radio waveform, wherein the control circuitry, in operation, does not perform, during baseband signal processing on the signal, windowing on the signal as the setting of the radio waveform when a first radio frequency band is used for transmission of the signal, and performs, during the baseband signal processing on the signal, windowing as the setting of the radio waveform when a second radio frequency band lower than the first radio frequency band is used for transmission of the signal.

2. The communication apparatus according to claim 1, wherein the control circuitry, in operation, performs discrete Fourier transform (DFT) on the signal as the setting of the radio waveform when the first radio frequency band is used for transmission of the signal, and does not perform the DFT on the signal as the setting of the radio waveform when the second radio frequency band lower than the first radio frequency band is used for transmission of the signal.

3. The communication apparatus according to claim 1, wherein the control circuitry, in operation, does not add a cyclic prefix (CP) to the signal as the setting of the radio waveform when the first radio frequency band is used for transmission of the signal, and adds the CP to the signal as the setting of the radio waveform when the second radio frequency band lower than the first radio frequency band is used for transmission of the signal.

4. The communication apparatus according to claim 1, wherein the control circuitry, in operation, does not perform inverse fast Fourier transform (IFFT) on the signal as the setting of the radio waveform when the first radio frequency band is used for transmission of the signal, and performs the IFFT on the signal as the setting of the radio waveform when the second radio frequency band lower than the first radio frequency band is used for transmission of the signal.

5. The communication apparatus according to claim 1, wherein the control circuitry, in operation, makes the setting of the radio waveform based on a propagation environment of communication in the radio frequency band.

6. The communication apparatus according to claim 1, wherein the control circuitry, in operation, makes the setting of the radio waveform based on antenna directivity used in the radio frequency band.

7. The communication apparatus according to claim 1, wherein the control circuitry, in operation, makes the setting of the radio waveform based on a subcarrier spacing used in the radio frequency band.

8. The communication apparatus according to claim 1, wherein the control circuitry, in operation, makes the setting of the radio waveform based on a cyclic prefix (CP) length used in the radio frequency band.

9. A communication method performed by a communication apparatus, the communication method comprising:

making a setting of a radio waveform of a signal according to a radio frequency band used for transmission of the signal; and transmitting the signal based on the setting of the radio waveform, wherein making the setting includes, not performing, during baseband signal processing on the signal, windowing on the signal as the setting of the radio waveform when a first radio frequency band is used for transmission of the signal, and performing, during the baseband signal processing on the signal, the windowing as the setting of the radio waveform when a second radio frequency band lower than the first radio frequency band is used for transmission of the signal.

* * * * *